United States Patent [19]

Veneau

[11] Patent Number: 4,744,587
[45] Date of Patent: May 17, 1988

[54] REAR AXLE ASSEMBLY FOR SUSPENSION OF MOTOR VEHICLES HAVING INDEPENDENT WHEELS

[75] Inventor: Jean Veneau, Rueil Malmaison, France

[73] Assignee: Regie Nationale des Usines Renault, Boulogne Billancourt, France

[21] Appl. No.: 41,282

[22] Filed: Apr. 22, 1987

[30] Foreign Application Priority Data

May 13, 1986 [FR] France .................. 86 06825

[51] Int. Cl.⁴ .............................. B60G 3/00
[52] U.S. Cl. ..................... 280/690; 280/701
[58] Field of Search ............. 280/688, 690, 701

[56] References Cited

U.S. PATENT DOCUMENTS 4,681,342  7/1987  Goerich ................. 280/701

FOREIGN PATENT DOCUMENTS 2822058 11/1979 Fed. Rep. of Germany ...... 280/690
3047004  7/1982 Fed. Rep. of Germany ...... 280/701
3426943  2/1985 Fed. Rep. of Germany ...... 280/701
1251262 12/1960 France .
2097496  3/1972 France .
2574027  6/1986 France .
  76313  5/1983 Japan ................................ 280/701

Primary Examiner—Ross Weaver
Attorney, Agent, or Firm—Oblon, Fisher, Spivak, McClelland & Maier

[57] ABSTRACT

A rear axle assembly for the suspension of a vehicle having independent wheels includes a steering knuckle defining a rear axle and having front and rear joints aligned with a joint axis which is forwardly inclined away from the vehicle. A linkage connects the front and rear joints to the vehicle body in such a manner that only the front joint moves horizontally away from the joint axis and closer to a central vehicle longitudinal axis in response to a rearward force being applied to the vehicle mounted on the rear axle, as a result of which toe-in is produced.

5 Claims, 2 Drawing Sheets

REAR AXLE ASSEMBLY FOR SUSPENSION OF MOTOR VEHICLES HAVING INDEPENDENT WHEELS

BACKGROUND OF THE INVENTION

1. Field of the Invention

This invention relates to a rear axle assembly for a motor vehicle, of the independent wheel type and for which the steering angle of the wheel plane under a crosswise force or braking induces a favorable toe-in effect.

2. Background of the Related Art

The consequences of a braking action or of a gust of cross wind to the vehicle, on the wheel plane of the latter, is well known.

Most suspensions, because of the flexibility of their elastic joints, undergo, under the above conditions, a deformation during which the front of the rear wheel is directed outward from the vehicle, i.e., toe-out in which the front of the wheel diverges outward instead of remaining parallel to the axis of the latter.

This change of geometry of the axle assembly has negative effects both on driving comfort and on road stability, causing an undesirable oversteering effect.

SUMMARY OF THE INVENTION

The rear axle assembly according to this invention has as its object to mitigate the preceding drawbacks by inducing a toe effect on the rear wheel concerned under the action of the cross forces or braking which is exerted on it.

BRIEF DESCRIPTION OF THE DRAWINGS

The above and other objects of the invention are carried out by a rear axle assembly for the suspension of a vehicle having independent wheels, in which steering knuckle defines a rear axle and has front and rear joints aligned with a joint axis which is forwardly inclined away from the vehicle, i.e., inclined toward the wheel plane as it extends in the forward direction. Linkage means connect the front and rear joints to a vehicle body such that only the front axle moves horizontally away from the joint axis and closer to a central vehicle longitudinal axis in response to a rearward force being applied to a wheel mounted on the rear axle.

In one embodiment, the linkage means comprise a cross arm connected to the body of the vehicle via a first joint having a horizontal pivot axis extending parallel with the longitudinal axis of the vehicle and being connected to the steering knuckle via a rear or second joint, and a triangular arm having one vertex connected to the steering knuckle at a front or third joint, another vertex connected to the cross arm at a fourth joint having a pivot axis parallel with the pivot axis of the first joint, and a third vertex connected to the vehicle body by a double joint having both a vertical pivot axis and a horizontal pivot axis. The double joint includes bushing means permitting the third vertext to move along the horizontal pivot axis, and the horizontal pivot axis thereof is forwardly inclined away from the vehicle. As a result, a braking force produces movement of the third vertex along the horizontal axis of the double joint, and so produces toe-in of a wheel mounted on the rear axle.

The bushing means of the second or rear joint permit relative movement between the steering knuckle and the cross arm along the pivot axis of the second joint.

According to another embodiment, the triangular arm has one vertex connected to the body of the vehicle via a first joint having a horizontal pivot axis, another vertex connected to the steering knuckle at the rear or second joint, and a tie rod having one end connected to the steering knuckle via the front or third joint, another end connected to the vehicle body via a ball joint and is connected to the third vertex of the triangular arm by another joint. The joints include elastic bushings so that a braking force produces pivoting of the pivot axis of the second joint about the second joint, and so an inward movement of the third joint resulting in toe-in of a wheel mounted on the rear axle. The second joint is stopped from rearward movement while the first joint can move along its pivotal axis.

Figure 1:
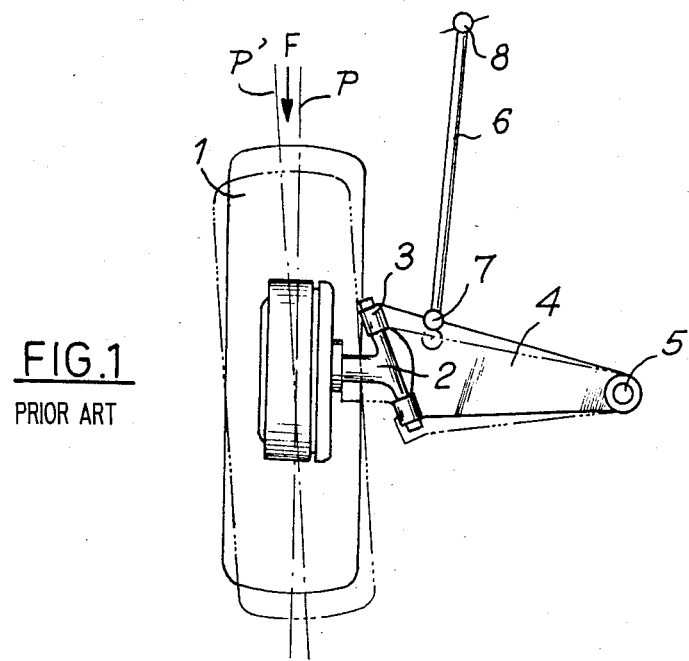
Figure 3:
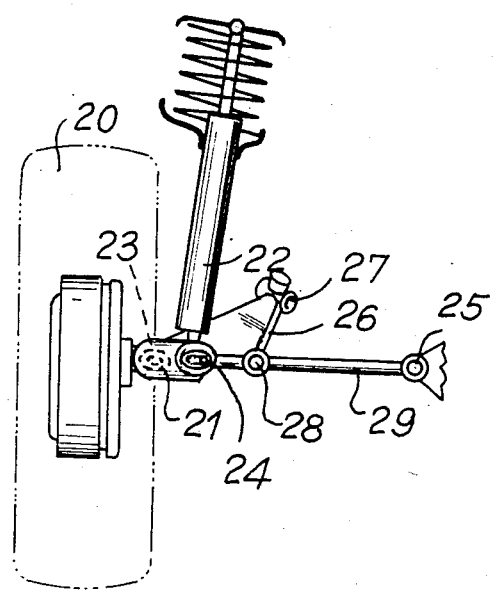
Figure 4:
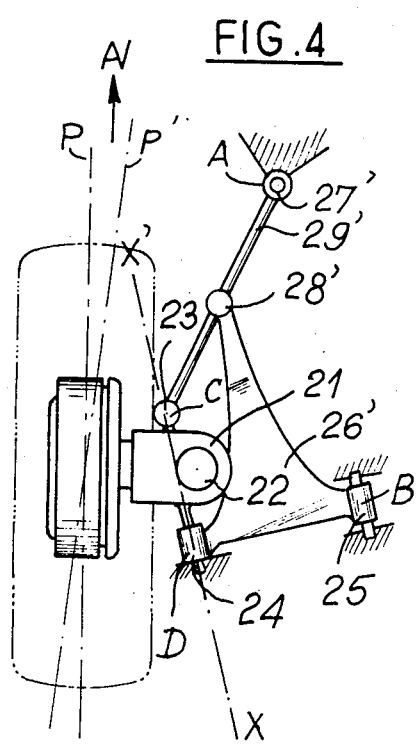
Figure 2:
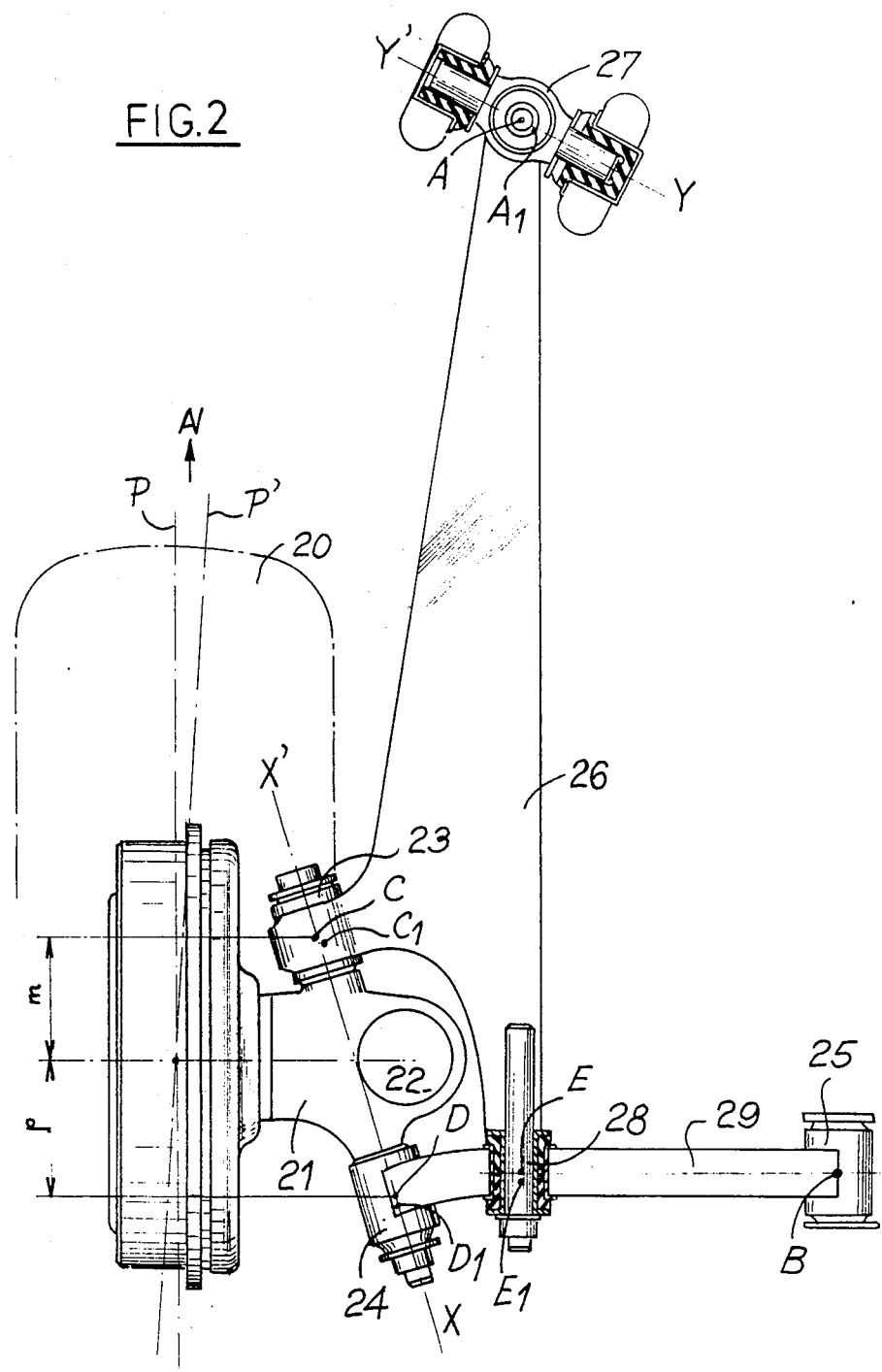

The invention will now be described by way of non-limiting example with reference to attached figures, wherein:

FIG. 1 is a diagram in plan view, of a rear axle assembly according to the prior art;

FIG. 2 is a plan view, of a rear axle assembly according to embodiment of this invention;

FIG. 3 is a back view of the preceding axle assembly and;

FIG. 4 is a plan view of a variant embodiment of the invention.

DETAILED DESCRIPTION OF THE PREFERRED EMBODIMENTS

With reference to FIG. 1, it is seen that wheel 1 is fastened to a steering knuckle 2 on which a torque arm rests supporting the body of the vehicle and which ends at an inclined horizontal shaft 3, around which a cross arm 4, connected top the body of the vehicle at 4, can pivot.

An oblique, approximately horizontal tie rod 6 joins arm 4 to the body by ball joints 7-8.

Under the action of a braking force F, and due to the play of the joints, the known axle assembly is deformed by taking the position that appears in dot-and-dash lines; it is seen that the recoil of arm 4 brings about an inclination of the plane of wheel 1 in the direction of its divergence in relation to the vehicle, i.e., toe-out thereby inducing in it an undesirable oversteering tendency.

The rear axle assembly according to the invention illustrated in FIG. 2 does not exhibit this drawback.

Wheel 20 is fastened to a steering knuckle 21 via a rear axle connected to the knuckle, which steering knuckle supports the lower part of a torque arm 22, and has at its base a double joint 23-24 located in an approximately horizontal plane so that the rear joint 23 is closer than the front joint 24 to the plane P of the wheel and oriented along an axis X'X that is forwardly divergent in relation to the longitudinal axis of the vehicle along an angle generally between 0° and 40°. Joints 23 and 24 are respectively in front of and behind an axis of the rear axle by distances E and e.

A cross arm 29 joins second joint 24 to the body via another or first joint 25 whose axis is parallel to that of the vehicle, while a triangular arm 26 joins, by means of two of its vertices, the other joint 23 of the steering knuckle (i.e. the third joint to) the body, and a double joint 27 having orthogonal pins located respectively in two—horizontal and vertical—planes. The third vertex of said triangle 26 connects with a fourth joint 28, whose axis is approximately parallel to that of joint 25, and which is fixed with cross arm 29.

Each of the preceding joints is ordinarily provided with elastomer elements imparting a certain latitude of relative angular movement to the pieces to be connected.

The arrangement of the elements of the above axle assembly and particularly the inclination of the horizontal Y'Y axis of joint 27, produces an instantaneous center of rotation of wheel 20 in relation to the body that is a toe-in in response to braking or cross wind forces.

It is further noted that the Y'Y axis is located in a horizontal plane of joint 27 and makes a forwardly divergent angle between 15° and 60° in relation to the longitudinal axis of the vehicle, making it possible to meet the above condition; the centers of joints 27, 25, 23, 24 and 28 are shown respectively by the letters A, B, C, D, E.

The nature of the elastomer used bushings in each of the joints varies depending on the purpose to be achieved. Thus, joint 23 should have a great axial rigidity, since it must drive arm 26 in the linkage under force; on the other hand, joint 24 should have only slight axial rigidity, because it does not participate in the movement of the arm 26, but should, on the other hand, as will be seen later, make possible a variation of distance CD in the elastic linkage.

In the same way, joint 27 should be able to move because of its elasticity, along Y'Y and oscillate around axis AB during the reciprocating movement of the suspension.

Triangle ACE constituted by arm 26 is nondeformable: it is a driving element in the linkage of the steering angle induced by force and acts on cross arm 29 when it recoils.

The longitudinal or crosswise forces resulting respectively from application of the brakes or gust of cross wind, act on point A and bring it to $A_1$.

By so doing, the rigid triangle constituted by arm 26 recoils, while causing the pivoting of cross arm 29 around B. The center of joints 28, 24 and 23 come to $E_1$, $D_1$ and $C_1$, thereby determining the desired rotation, in the direction of the toe of the axis CD of wheel support to $C_1$, $D_1$ causing a steering angle of plane P of wheel 20 to move to P'.

That is, a braking force, for example, would apply a rearwardly directed force on the rear axle which would cause the joint center A to slide along the axis Y-Y' (to the right in FIG. 2). Since the joint 24 is connected to the joint 25 having a fixed center B via the cross arm 29, its center D will pivot about B, and so move from D to D1, i.e., will move along the axis X-X'. The center E of joint 28 will also pivot about center B of joint 25, but will also respond to the movement of the triangular arm 26, and so will move from E to E1.

The center C of joint 23, being mounted on the triangular arm 26, will pivot with this arm to the position C1. As a result, since joint center C moves righward (as seen in FIG. 2) relative to the axis X-X', but the center D simply moves along this axis, the axis X-X' will itself rotate in a clockwise direction, causing toe-in of the wheel 20.

The same effect would be obtained if the strut of the MacPherson type was replaced by an upper triangle or by two equivalent connecting rods.

The variant of FIG. 4 differs from the preceding embodiment at the position of the joining of steering knuckle 21 to the body, by means of a nondeformable triangle 26' and a tie rod 29', whose arrangement is reversed compared with FIG. 2.

Actually in this case, front joint 23 is connected to a ball joint 27' connected with the body by the tie rod 29', while joint 25 is connected with the body by the base of the nondeformable triangular arm 26', whose vertex is fastened to tie rod 29' by a joint 28'.

As in the preceding case, the joints in question have elastomer elements making possible for them a certain angular deformation and the structure of the axle assembly determines an instantaneous center of rotation such that the wheel is subject to toe-in.

As in the preceding case, actuation of the brakes exerts its action on tie rod 29', placed in front of the rear axle and controls the recoil of the EBD triangle which can slide along axis AB.

By so doing, axis CD of the wheel support and its plane P are inclined in the direction of toe-in at P', with as a consequence the desired understeering tendency of the vehicle.

That is, in repsonse to a rearward force on the wheel, for example produced by braking, the joint 24 is prevented from moving backward, since it is rearwardly stopped by the vehicle body, however the joint 25 can slide along its pivot axis, causing a clockwise rotation of the triangular arm 26'. Since the joint 28' is connected to the tie rod 29', the tie rod 29' will rotate about center A in a counterclockwise direction, as a result of which the joint 23 will move inward toward the center longitudinal axis of the vehicle body. The axis X-X' will accordingly rotate in a clockwise direction about joint 24, resulting in toe-in of the wheel.

What is claimed as new and desired to be secured by Letters Patent of the United States is:

1. A rear axle assembly for the suspension of a vehicle having independent wheels, comprising:
    a steering knuckle defining a rear axle;
    a cross arm connected to a body of the vehicle via a first joint having a horizontal pivot axis extending parallel with a longitudinal axis of said vehicle, said cross arm being connected to said steering knuckle via a second joint positioned behind said rear axle relative to said vehicle axis and having a horizontal pivot axis forwardly inclined away from the vehicle; and
    a triangular arm having one vertex connected to said steering knuckle at a third joint positioned adhead of said rear axle relative to said vehicle axis and having a pivot axis aligned with said pivot axis of said second joint, said triangular arm having another vertex connected to said cross arm at a fourth joint having a pivot axis parallel with the pivot axis of said first joint, said triangular arm having a third vertex connected to the vehicle body by a double joint having a vertical pivot axis and a horizontal pivot axis,
    wherein said double joint includes bushing means permitting said third vertex to move along said horizontal pivot axis of said double joint and wherein said horizontal pivot axis is forwardly inclined away from the vehicle, whereby a braking force produces movement of said third vertex along said horizontal pivot axis of said double joint and toe-in of a wheel mounted on said rear axle.

2. The assembly of claim 1 wherein said second joint includes bushing means permitting relative movement of said steering knuckle and said cross arm along said pivot axis of said second joint.

3. A rear axle assembly for the suspension of a vehicle having independent wheels, comprising:
   a steering knuckle defining a rear axle;
   a triangular arm having one vertex connected to a body of the vehicle via a first joint having a horizontal pivot axis, said triangular arm having another vertex connected to said steering knuckle at a second joint positioned behind said rear axle relative to a vehicle longitudinal axis and having a horizontal pivot axis forwardly inclined away from the vehicle; and
   a tie rod having one end connected to said steering knuckle via a third joint positioned ahead of said rear axle relative to said rear axle and along said pivot axis of said second joint, said tie rod being connected to a third vertex of said triangular arm, another end of said tie rod being connected to the vehicle body via a ball joint,
   wherein said joints include elastic bushings, whereby a braking force produces pivoting of said pivot axis of said second joint about said second joint and toe-in of a wheel mounted on said rear axle.

4. The assembly of claim 3 wherein said second joint is rearwardly stopped along said pivot axis thereof.

5. The assembly of claim 4 wherein said first joint is slidable along the pivot axis thereof.

* * * * *